(12) United States Patent
Fege (10) Patent No.: US 8,365,905 B2
(45) Date of Patent: Feb. 5, 2013

(54) MOVEMENT DEVICE ON AN ENDLESS BELT OF ADAPTABLE PATH

(75) Inventor: Francois-Loic Fege, Vouziers (FR)

(73) Assignee: Fege Sarl, Vouziers (FR)

( * ) Notice: Subject to any disclaimer, the term of this patent is extended or adjusted under 35 U.S.C. 154(b) by 429 days.

(21) Appl. No.: 12/615,416

(22) Filed: Nov. 10, 2009

(65) Prior Publication Data

US 2010/0116627 A1  May 13, 2010

(30) Foreign Application Priority Data

Nov. 10, 2008 (FR) ...................................... 08 57629

(51) Int. Cl.
*B65G 21/14* (2006.01)

(52) U.S. Cl. ....................... 198/812; 198/594; 198/347.1

(58) Field of Classification Search ............... 198/347.1, 198/460.2, 594, 812
See application file for complete search history.

(56) References Cited

U.S. PATENT DOCUMENTS

| 4,413,724 A | 11/1983 | Fellner |
| 6,152,291 A | 11/2000 | Steeber et al. |
| 6,591,963 B2 * | 7/2003 | Wipf .......................... 198/347.2 |
| 6,848,563 B2 * | 2/2005 | Abert et al. ................ 198/347.1 |
| 7,011,203 B2 * | 3/2006 | Spatafora .................. 198/347.1 |
| 7,219,788 B2 * | 5/2007 | Tuck et al. ................ 198/347.2 |

FOREIGN PATENT DOCUMENTS

| EP | 1 275 603 A | 1/2003 |
| FR | 2 505 794 | 11/1982 |
| WO | WO 01/98187 A | 12/2001 |

* cited by examiner

*Primary Examiner* — Gene Crawford
*Assistant Examiner* — William R Harp
(74) *Attorney, Agent, or Firm* — Hamre, Schumann, Mueller & Larson, P.C.

(57) ABSTRACT

A movement device having an endless belt with a working portion defined in a substantially horizontal working plane and a reserve portion defined in a reserve plane optionally coinciding with said working plane; a first guide wheel linearly moveable in said working plane and guiding the endless belt; a second guide wheel linearly moveable in said reserve plane and guiding the endless belt; two deflector members for deflecting the endless belt from the working plane to the reserve plane; drive mechanism for driving the endless belt; and movement mechanism for synchronously moving the two guide wheels in such a manner that the sum of the distances between each of the guide wheels and the deflector members is constant. The length of the working portion of the endless belt is capable of varying continuously and the quantity of articles that can be placed on the working portion of the belt can vary accordingly.

9 Claims, 9 Drawing Sheets

MOVEMENT DEVICE ON AN ENDLESS BELT OF ADAPTABLE PATH

FIELD OF THE INVENTION

The present invention relates to a movement device enabling one or more articles to be moved along a variable path.

BACKGROUND OF THE INVENTION

In production or packaging lines, it is common practice for articles to be caused to transit from a first workstation to a second workstation via one or more intermediate conveyors. Generally, such conveyors have a working length that is constant, and the path followed by the articles they transport does not vary.

Nevertheless, under certain circumstances, it is necessary to adapt the path length of the articles as a function of particular production or maintenance constraints.

For example, in the above-mentioned situation, when the second workstation is stopped while the first workstation continues to operate normally, it is necessary to be able to store temporarily a certain number of articles upstream from the second workstation during the time that it is stopped.

Movement devices are already known that enable the number of articles that can be transported at a given time t between first and second workstations to be increased in a continuous manner, by continuously varying the length of the path traveled by the articles. Document U.S. Pat. No. 6,152,291 describes an example of a device enabling articles from an inlet conveyor to be deflected towards an adjacent outlet conveyor that is driven in the opposite direction, with the distance traveled by each article on the inlet conveyor and on the outlet conveyor being adaptable depending on requirements. To achieve that object, the device has a rotary wheel located in an empty space situated between the two conveyors, and a guide fastened to the rotary wheel and flush with the surfaces of the two conveyors, the guide being substantially circular and wide enough to deflect all of the articles from the inlet conveyor towards the wheel and from the wheel towards the outlet conveyor. The wheel is arranged in such a manner as to be capable of being moved in the longitudinal direction of said conveyors so as to vary the working lengths of the conveyors, i.e. the lengths over which the articles can be transported. By increasing the total length of the belt on which the articles can be placed, the number of articles that can be transported at a given instant t between the inlet conveyor and the outlet conveyor is increased.

The device described in document U.S. Pat. No. 6,152,291 enables the path length of the articles to be varied but it requires at least two conveyors to be used for that purpose together with an intermediate rotary wheel and a guide enabling the articles to be deflected from the first conveyor to the second. The drawback of such a device lies in the need to cause the articles to transit over a plurality of transport mechanisms, thereby increasing the risk of damaging the articles, and above all running the risk of requiring rate of throughput to be slowed down.

OBJECT AND SUMMARY OF THE INVENTION

The object of the present invention is thus to propose an article displacement device enabling the paths of said articles to be varied without causing them to transit over a plurality of transport mechanisms.

This object is achieved by means of a movement device of the invention by virtue of the fact that it comprises a conveyor constituted by an endless belt comprising a working portion defined in a substantially horizontal working plane and a reserve portion defined in a reserve plane optionally coinciding with said working plane; a first guide wheel linearly movable in said working plane and guiding the endless belt; a second guide wheel linearly movable in said reserve plane and guiding the endless belt; two deflector members for deflecting the endless belt from the working plane to the reserve plane; drive means for driving the endless belt; and movement means for synchronously moving the two guide wheels in such a manner that the sum of the distances between each of the guide wheels and the deflector members is constant; whereby the length of the working portion of the endless belt is capable of varying continuously and the quantity of articles that can be placed on the working portion of the belt can vary accordingly.

In a second embodiment of the invention, the movement device further comprises at least one second guide wheel linearly movable in said working plane; at least one stationary u-turn member in said working plane to deflect the endless belt from a first movable guide wheel to a second movable guide wheel; at least one second guide wheel linearly movable in said reserve plane; at least one stationary u-turn member in said reserve plane for deflecting the endless belt from a first movable guide wheel to a second movable guide wheel; and at least one second movement means for the second guide wheels for moving said second guide wheels synchronously in such a manner that the sum of the distances between each guide wheel and the deflector members remain constant.

Advantageously, the working plane and the reserve plane are parallel.

In an embodiment of the invention, the two deflector members are pulleys driven by a motor, and they constitute said drive means for driving the endless belt.

In another embodiment of the invention, the linearly movable guide wheels are driven in rotation by a motor, and they constitute said drive means for driving the endless belt.

The or each said movement means may be a guide belt having a pair of guide wheels fastened thereto in such a manner that when the belt moves, it moves the two guide wheels, thereby causing the length of the working portion of the endless belt to vary.

Advantageously, two associated guide wheels move linearly in a common guide plane.

Advantageously, two associated guide wheels move linearly in opposite directions in parallel.

The or each guide plane in which a pair of guide wheels is preferably perpendicular to the working plane.

By way of example, the movement device of the present invention may be used for temporary storage of articles between a first working station and a second working station.

BRIEF DESCRIPTION OF THE DRAWINGS

Other characteristics and advantages of the invention appear on reading the following made by way of non-limiting example and with reference to the accompanying drawings, in which.

MORE DETAILED DESCRIPTION

Figure 1:
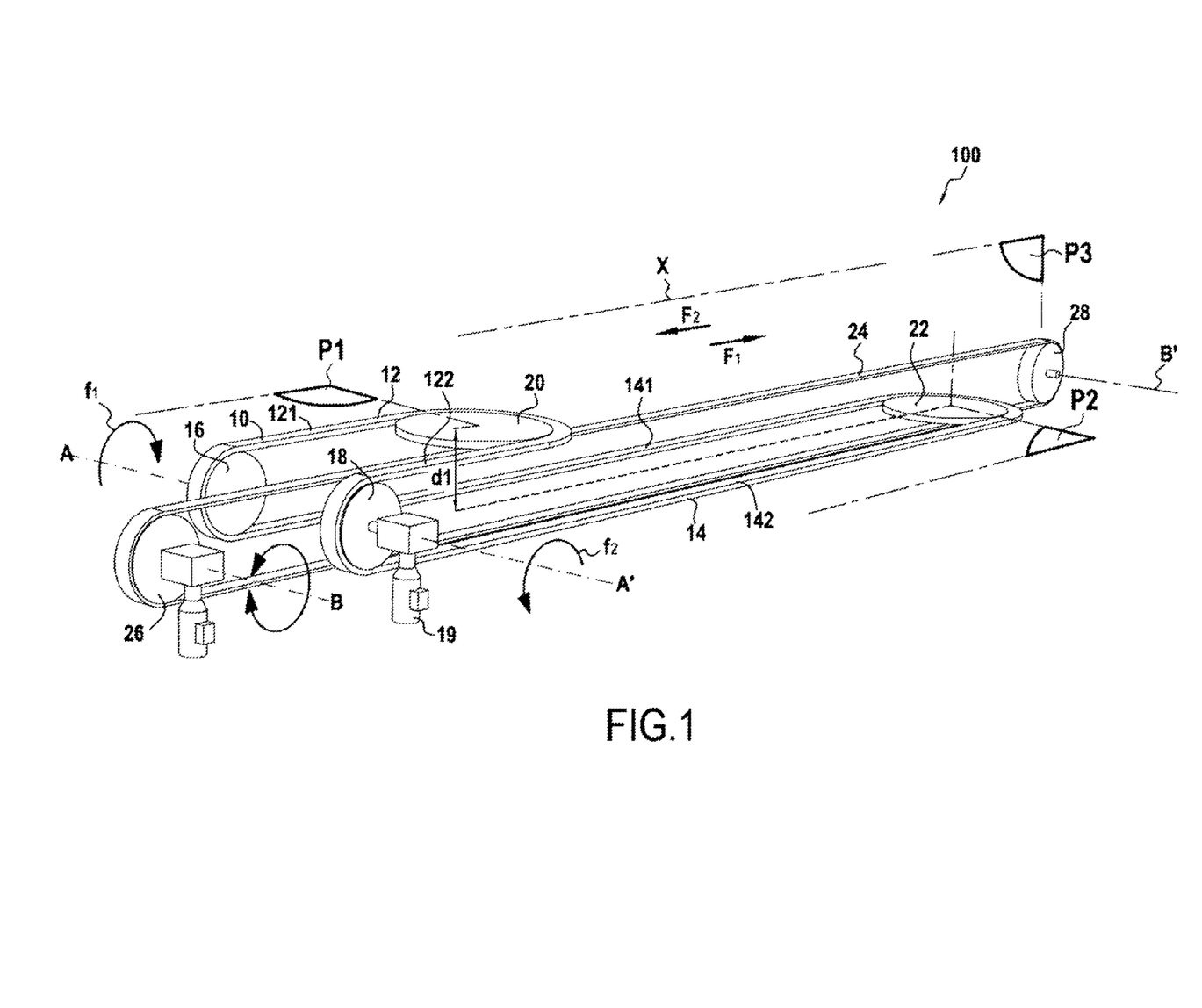
FIG. 1 is a perspective view of a movement device constituting a first embodiment of the present invention.

FIG. 1 shows a movement device in a first embodiment of the present invention.

The movement device 100 comprises an endless belt 10 made up of a working portion 12 for transporting articles and a reserve portion 14 constituting a reserve length of the belt.

The working portion 12 of the endless belt 10 is defined in a horizontal working plane P1. In the example shown in FIG. 1, the reserve portion 14 is defined in a reserve plane P2 parallel to the working plane P1 and spaced apart therefrom by a distance d1. The reserve plane P2 is situated under the working plane P1. In this way, the installation can conserve a degree of compactness and the reserve portion 14 can be hidden by an outer casing of the machine or by a floor. In another embodiment of the invention, the reserve plane P2 may coincide with the working plane P1. In yet another embodiment, the reserve plane P2 and the working plane P1 may intersect.

The endless belt 10 is deflected from the working plane P1 towards the reserve plane P2 by deflector pulleys 16 and 18.

The first deflector pulley 16 is driven to rotate about an axis A in a direction f1. It deflects the endless belt 10 from the reserve plane P2 towards the working plane P1.

The second deflector pulley 18 is driven to rotate about an axis A' in a direction f2 that is opposite to the direction f1, the axes A and A' coinciding in this example. The second deflector pulley 18 deflects the endless belt 10 from the working plane P1 towards the reserve plane P2.

In the example shown in FIG. 1, the deflector pulleys 16 and 18 both have a diameter equal to the distance d1 between the working plane P1 and the reserve plane P2. The endless belt 10 thus forms a U-shape on its side with its top branch constituting the working portion 12 and its bottom branch constituting the reserve portion 14.

It is clear that, in other embodiments of the invention, the axes of rotation A and A' of the two deflector pulleys 16 and 18 could equally well be parallel or intersecting.

The working portion 12 of the endless belt 10 is constituted by a first rectilinear strand 121 and by a second rectilinear strand 122 parallel to the first, defined parallel to an axis X shown in FIG. 1, and extending respectively from one of the pulleys 16, 18 to a first fold zone for the belt 10. In this fold zone, the endless belt 10 is guided around a guide wheel 20 situated in the working plane P1. In FIG. 1, the first rectilinear strand 121 of the working portion 12, situated downstream from the first pulley 16, moves parallel to the axis X in a direction F1. The second rectilinear strand of the working portion moves parallel to the axis X in the direction F2 opposite to F1.

In the same manner, as shown in FIG. 1, the reserve portion 14 of the endless belt 10 is constituted by a first rectilinear strand 141 and by a second rectilinear strand 142 both defined parallel to the axis X and extending respectively from one of the pulleys 16, 18 to a second fold zone for the belt 10. The first rectilinear strand 141 of the reserve portion 14, situated upstream from the pulley 16 moves parallel to the axis X in the direction F2. The second rectilinear strand 142 of the reserve portion 14 moves parallel to the axis X in the direction F1 opposite to F2.

The two pulleys 16 and 18 are driven by a motor 19 and they drive movement of the endless belt 10 around the guide wheels 20 and 22. In another embodiment of the invention, the deflector pulleys 16 and 18 are passive and it is the guide wheels 20 and 22 that drive the endless belt 10.

In the embodiment shown in FIG. 1, the rectilinear strands 121 and 122 forming the working portion, and the strands 141 and 142 forming the reserve portion are all directed parallel to the axis X. In other embodiments of the invention, these strands could be directed in other directions.

According to the invention, the length L of the working portion 12 of the endless belt 10 is variable. In this way, the path traveled by the articles placed on the endless belt is variable, as is the total number of articles that can be transported on the endless belt at an instant t. This object is achieved with the guide wheels 20, 22 by virtue of the fact that they are movable in translation, synchronously, parallel to the axis X, so that the sum of the distance between each guide wheel and the deflector pulleys remain constant.

For this purpose, the two guide wheels 20 and 22 have their axes of rotation mounted on a belt that is referred to as the guide belt 24. The guide belt 24 is defined in a guide plane P3 that, in this example, corresponds to the plane of symmetry S of the movement device 100, perpendicular to the working plane P1 and parallel to the axis X. It is driven by two guide pulleys 26 and 28 of diameter d1 equal to the distance between the working plane P1 and the reserve plane P2. The respective axes of rotation B and B' of the two guide pulleys 26 and 28 are mutually parallel and perpendicular to plane of symmetry S of the movement device 100. One of the guide pulleys 26 is situated close to the deflector pulleys 16 and 18, such that the guide wheel 20 situated in the working plane P1 can be taken to almost between the two deflector pulleys 16 and 18. In this extreme position, the length L of the working portion of the endless belt 10 is at its minimum. The second guide pulley 28 is situated at a distance away from the deflector pulleys 16 and 18 that is sufficient for the amplitude of the movement of the guide wheels 20 and 22 to be sufficient, as is the amplitude of length variation ΔL of the working portion 12 of the endless belt 10.

Other movement means could be used in other embodiments of the invention for moving the guide wheels 20 and 22 in synchronous manner.

The operation of the movement device 100 is described in greater detail below with reference to FIGS. 3 to 11.

The width of the endless belt 10 may be adapted to the nature and the volume of the transported articles. The articles may transit on the endless belt equally well as a single file or in a mass flow. For example, articles that might be difficult to accumulate such as fragile packets, chocolate bars, bottles of special shapes, and articles that need to conserve a constant orientation (that need to face in a particular direction) will usually be transported in a single file. Conversely, articles that withstand high levels of pressure and that are easy to put back into a single file by means of an aligner will generally transit in a mass flow.

The endless belt 10 may be constituted by a plurality of modules connected to one another to form a closed loop belt. In general, the module needs to present two degrees of freedom, one in rotation about an axis perpendicular to the transport surface of the endless belt, and the second in rotation about an axis perpendicular to the advance direction of the endless belt and parallel to the transport surface of said belt. In this way, the endless belt can deform firstly on passing around the guide wheels 20 and 22 in the working plane P1 or in the reserve plane P2, and secondly on passing around the deflector pulleys 16 and 18, between those two planes.

Figure 2A:
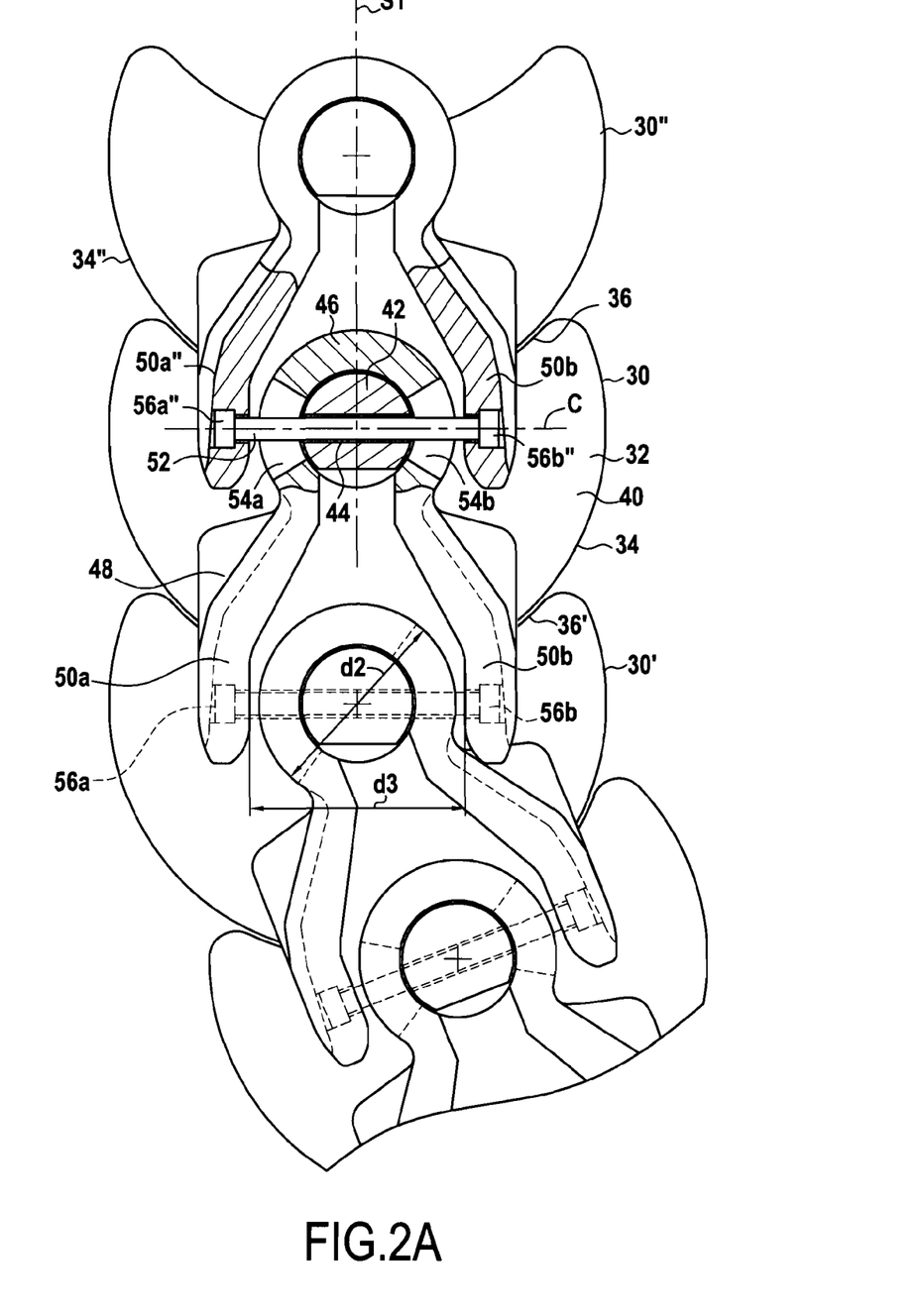
FIGS. 2A and 2B show an example of a module suitable for use in constituting the endless belt.
Figure 2B:
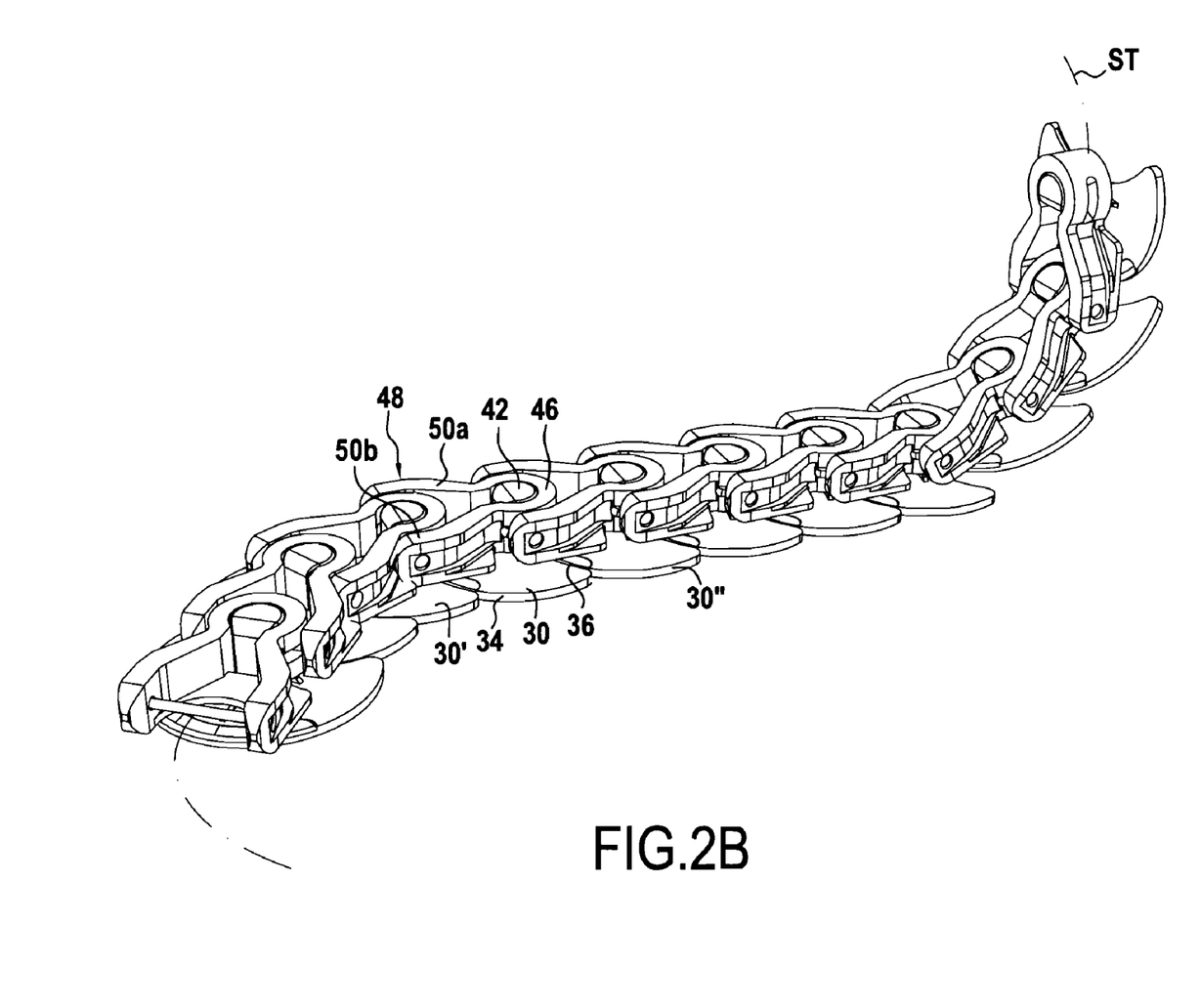

An example of a module suitable for use in constituting such an endless belt is shown in FIG. 2A. The module 30 comprises a plate 32 of quarter-moon shape, with its convex side 34 serving to co-operate with the concave side 36' of an adjacent module 30', and with its concave side 36 serving to co-operate with the convex side 34" of an adjacent module 30". The module 30 presents a top transport face (not shown) and a bottom face 40 where there are arranged the elements that enable the module 30 to be connected with the adjacent modules 30' and 30". The module has a stud 42 perpendicular to the transport surface that projects from the bottom face 40 of the module 30. In its distal portion, the stud 42 has a through hole 44 of axis C perpendicular to the plane of symmetry ST of the module 30. The stud 42 is surrounded over practically all of its periphery by a head portion 46 of a link 48. The head portion 46 of the link 48 is extended by two link arms 50a and 50b situated facing each other and spaced apart at their ends by a distance d3 that is greater than the outside diameter d2 of the link head 46. A pin 52 is mounted in the through hole 44. This pin 52 passes through oblong slots 54a and 54b provided on either side of the link head 46 and it is fastened in holes 56a" and 56b" formed in the ends of the respective link arms 50a" and 50b" of an adjacent module 30". The slots 54a and 54b provided in the link head 46 enable the link 48 to turn about the stud 42. As a result, the endless belt 10 is capable of pivoting about the guide wheels 20 and 22. Furthermore, the pin 52 constitutes a pivot that enables the endless belt to be deflected from the working plane towards the reserve plane by the deflector pulleys 16, 18. FIG. 2B shows a portion of the endless belt that is made up of modules as described above.

An example of the module device of the invention in use for temporarily storing articles between a feed conveyor and an outlet conveyor is described below with reference to FIGS. 3 to 11.

Figure 3:
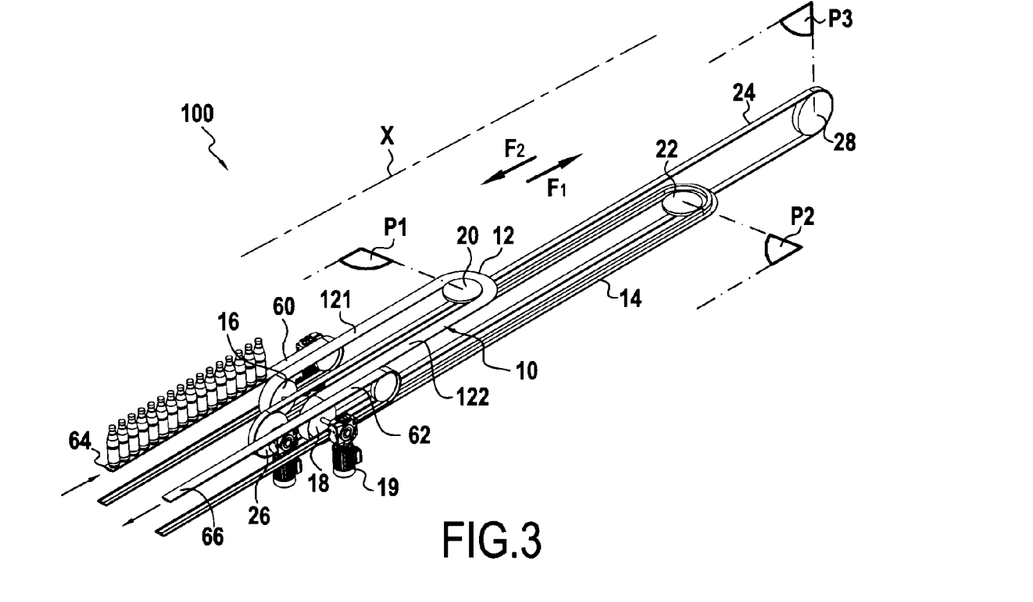
FIGS. 3 and 4 show a movement device of the invention in its through mode.

As shown in FIG. 3, the module device 100 is placed between a feed conveyor 60 and an outlet conveyor 62. The feed conveyor 60 and the outlet conveyor 62 move parallel to the axis X in opposite directions F1 and F2. The feed conveyor 60 is adjacent to the first strand 121 of the working portion 12 of the endless belt 10 and its transport surface 64 lies in the same working plane P1 as the working portion 12. Similarly, the outlet conveyor 62 is adjacent to the second strand 122 of the working portion 12 of the endless belt 10 and its transport surface 66 is situated in the same working plane P1.

By means of a guide (not shown) overlying the transport surface 64 of the feed conveyor 60, the articles can easily be deflected from the feed conveyor 60 onto the first strand 121 of the working portion 12 in an article inlet station. In like manner, by means of a guide (not shown) overlying the transport surface 66 of the outlet conveyor 62, the articles can easily be deflected from the second strand 122 of the working portion 12 towards the outlet conveyor 62 at an article outlet station.

Articles can transit from a first machine M1 (not shown) towards a second machine M2 (not shown) via the first conveyor 60, the module device 100, and then the second conveyor 62. When the second machine M2 is temporarily stopped, the outlet conveyor 62 is stopped so that it ceases to convey articles towards the machine M2, while the machine M1 continues to deliver articles at its usual rate. The module device 100 of the invention serves to increase the length L of the working portion 12 of the endless belt 10 in known manner, thereby simultaneously increasing the number M of articles that can be placed on the belt at an instant t. The increase in the support capacity of the endless belt 10 can be considered as temporary storage or accumulation of articles between the article inlet station and the article outlet station.

Figure 4:
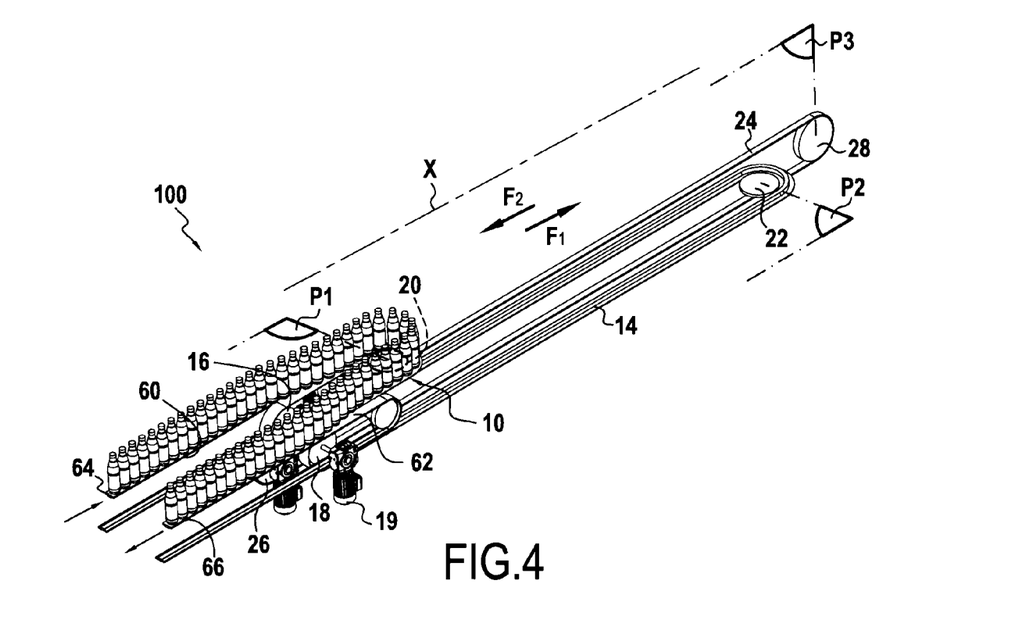
Figure 5:
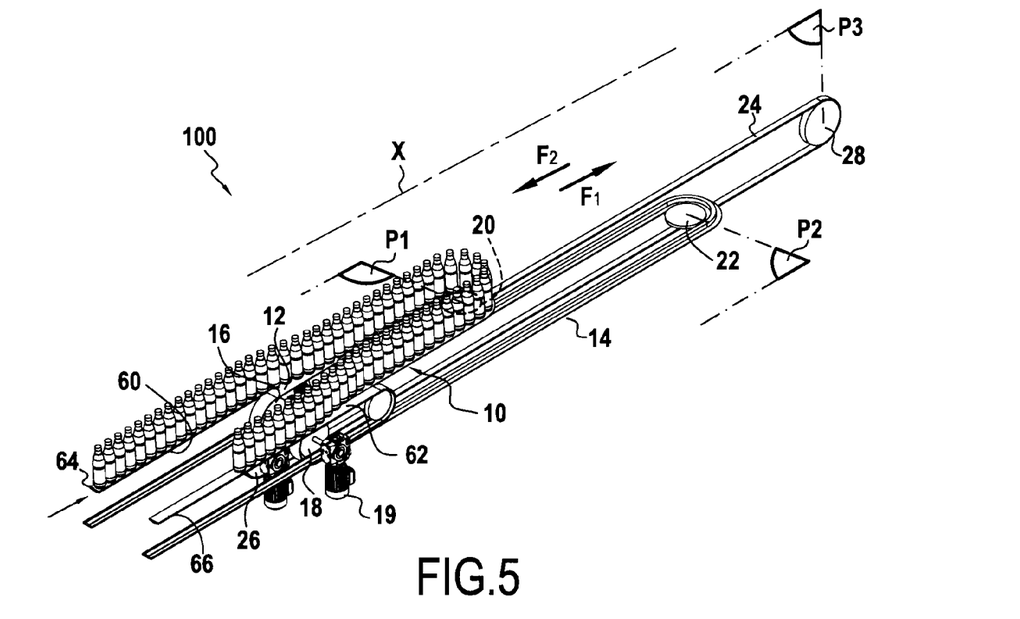
FIGS. 5 to 8 show various steps in the accumulation stage of the movement device.
Figure 6:
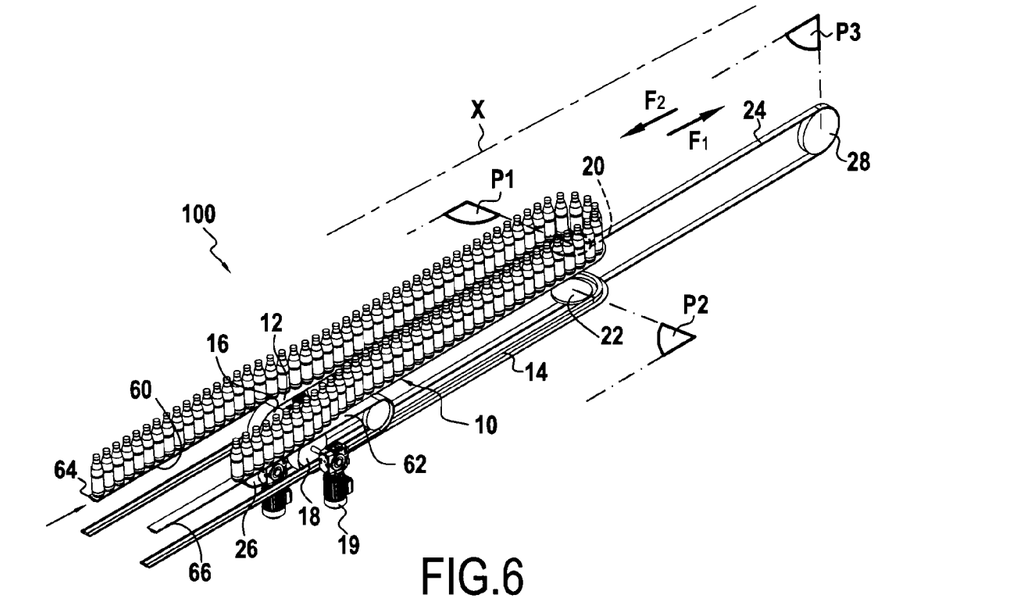
Figure 7:
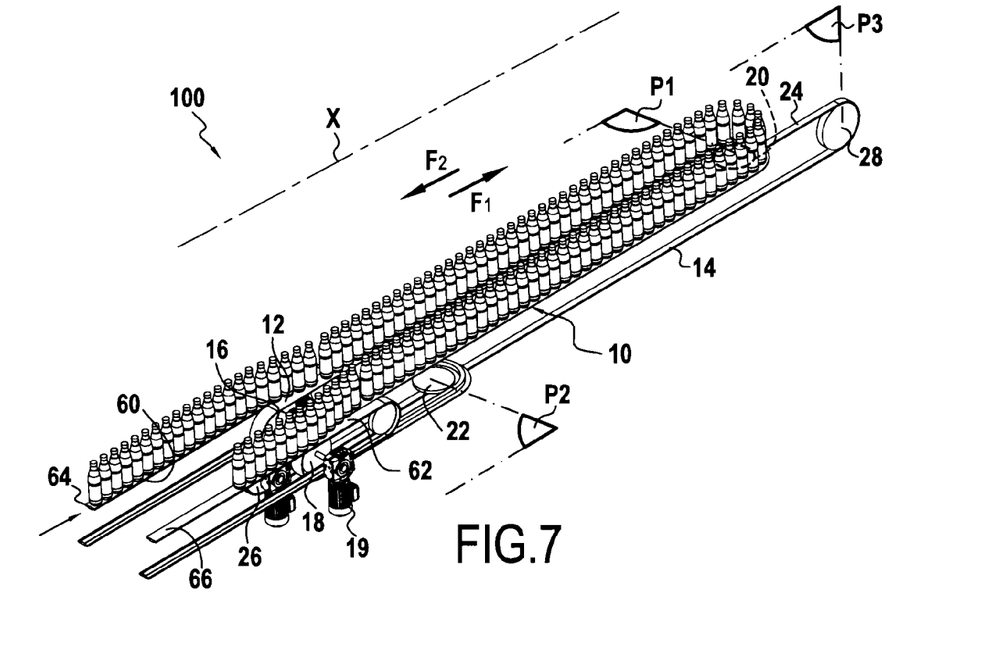
Figure 8:
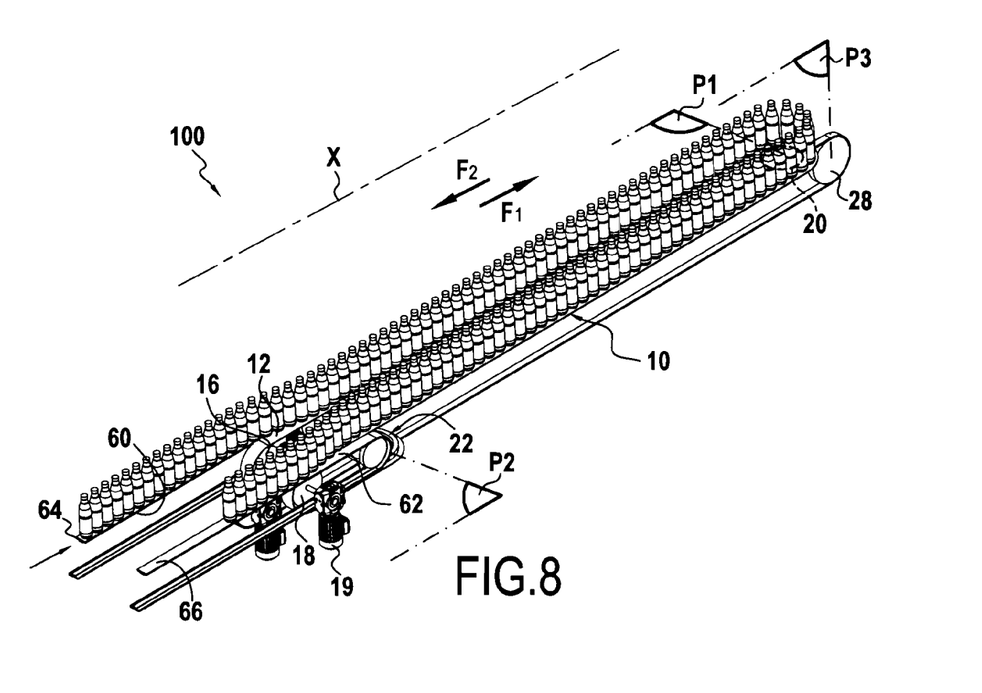

In FIGS. 3 and 4, the module device 100 is shown in a "through" mode of operation, where the guide wheels 20 and 22 are stationary and the length L of the working portion 12 of the endless belt 10 remains constant. The articles transit directly from the feed conveyor 60 to the outlet conveyor 62 via the working portion 12 of the endless belt 10 at its constant minimum length L1.

When the outlet conveyor 62 is stopped, an accumulation stage starts. The guide belt 24 is driven continuously about the guide pulleys 26 and 28 so that the guide wheel 20 lying in the working plane P1 is moved parallel to the axis X in the direction F1. In this way, the length L of the working portion 12 of the endless belt 10 increases progressively and the number N of articles that can be accumulated at an instant t between the feed and outlet conveyors 60 and 62 increases simultaneously.

FIGS. 5 to 8 show various steps in the accumulation stage. The working portion 12 of the endless belt 10 reaches its maximum accumulation capacity when the guide wheel 20 situated in the working plane P1 reaches its extreme position furthest away from the article inlet station on the endless belt 10.

Figure 9:
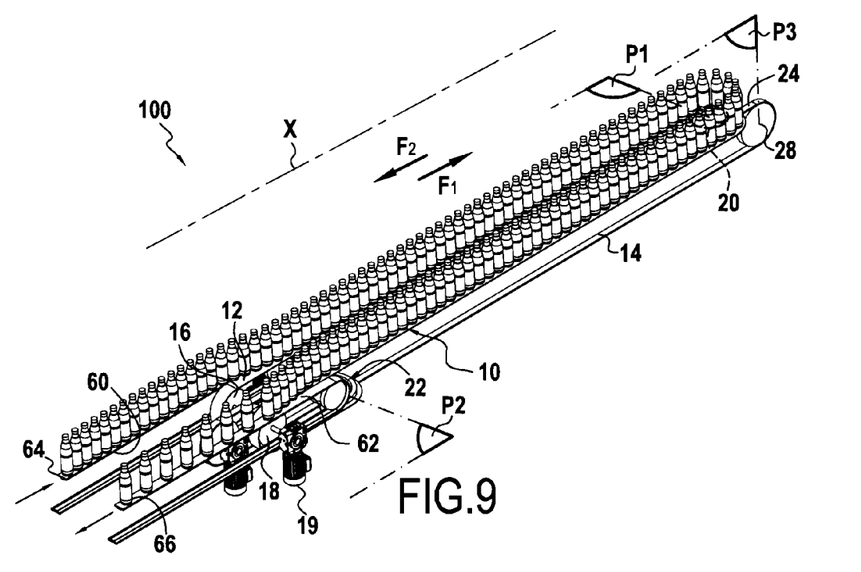
FIGS. 9 to 11 show various steps in the emptying stage of the movement device.
Figure 10:
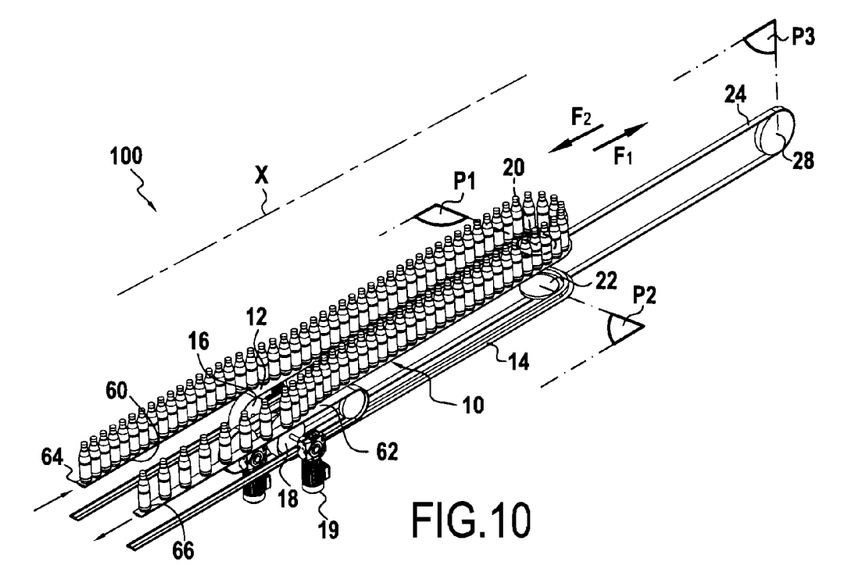
Figure 11:
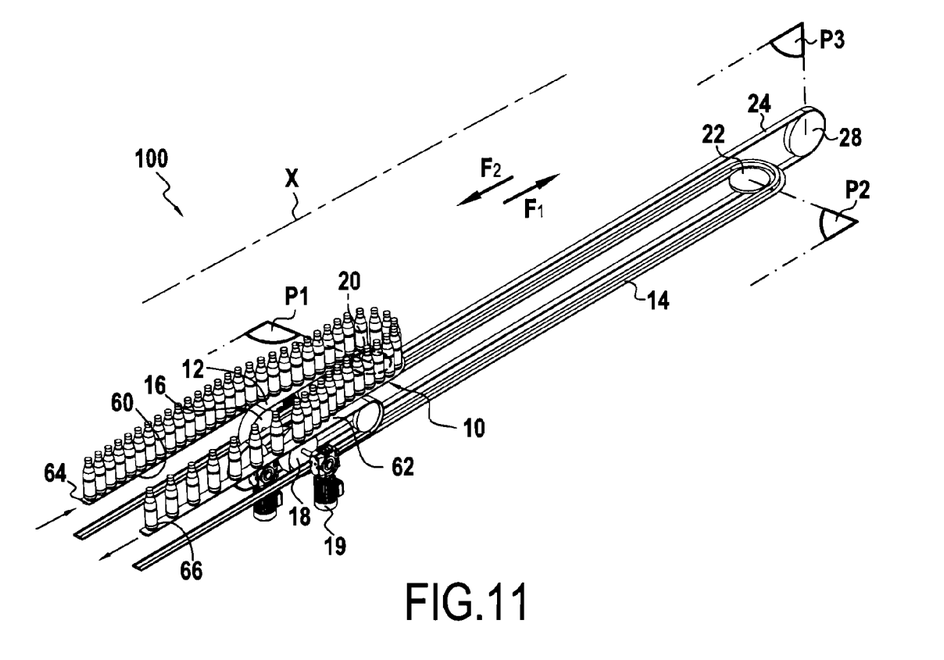

FIGS. 9 to 11 show various steps in the stage of emptying the endless belt.

FIG. 9 shows the beginning of the "emptying" stage of the module device that occurs once the outlet conveyor 62 is put back into operation. As emptying takes place, the guide wheel 20 situated in the working plane P1 is taken progressively towards its initial position, which corresponds to its extreme position closest to the article inlet station on the endless belt 10, and the length L of the working module 12 of the endless belt 10 returns to its smallest value L1.

FIG. 11 shows the end of the emptying stage, at a moment when the module device is once more operating in through mode.

A second embodiment of the invention is described below with reference to FIGS. 12A and 12B.

By retaining an operating principle similar to that of the above embodiment, the second embodiment seeks to increase the amplitude of variation in the length L of the working portion of the endless belt, thereby increasing the number of articles that can be transported by the belt 10 at an instant t, while maintaining a degree of compactness for the device.

To achieve this object, the module device described above is duplicated.

As in the first embodiment of the invention, the module device 200 comprises an endless belt 10 made up of a working portion 12 defined in a working plane P1 and a reserve portion 14 defined in a reserve plane P2 parallel to the working plane P1.

The endless belt 10 is deflected from the working plane P1 towards the reserve plane P2 by means of deflector pulleys 16 and 18.

In the working plane and the reserve plane, the belt is no longer constituted merely by two rectilinear strands extending on either side of a fold zone, as in the first reserve. The belt follows an undulating path both in the working plane and in the reserve plane, made up of a succession of curves that alternate between being concave and convex, thereby enabling the total length of the belt to be increased while maintaining a degree of compactness for the module device overall.

In the working plane P1, the belt has a first rectilinear strand 121 connecting the first deflector pulley 16 to a first guide wheel 20, a second rectilinear strand 122 connecting the first guide wheel 20 to a stationary u-turn wheel 70, a third rectilinear strand 123 connecting the stationary u-turn wheel 70 to a second guide wheel 20', and a fourth rectilinear strand 124 connecting the second guide wheel 20' to the second deflector pulley 18. All four rectilinear strands 121 to 124 extend parallel to the axis X.

In quasi-symmetrical manner, in the reserve plane P2, the belt 10 has a first rectilinear strand 141 connecting the first deflector pulley 16 to a first guide wheel 22, a second rectilinear strand 142 connecting the first guide wheel 22 to a stationary u-turn wheel 72, a third rectilinear strand 143 connecting the stationary u-turn wheel 72 to a second guide wheel 22', and a fourth rectilinear strand 144 connecting the second guide wheel 22' to the second deflector pulley 18. The four rectilinear strands 141 to 144 likewise all extend parallel to the axis X.

The stationary u-turn wheels 70 and 72 perform a function in this embodiment that is substantially identical to that of the deflector pulleys.

Guide wheels are said to be "associated" when they comprise two guide wheels situated in a common guide plane perpendicular to the working plane and parallel to the axis X. Two associated guide wheels are connected to a guide belt for moving them synchronously in such a manner that the sum of the distances between each guide wheel and the deflector pulleys is constant.

The associated guide wheels 20, 22 are fastened to a guide belt 24 defined in a guide plane P3 and the associated guide wheels 20' and 22' are fastened to a second guide belt 24' defined in a guide plane P3'.

Figure 12A:
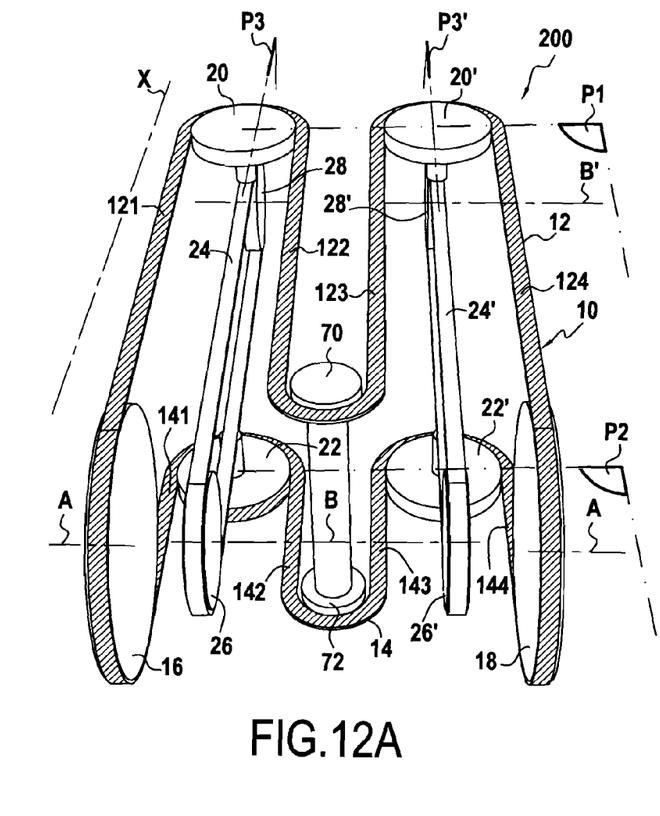
FIGS. 12A and 12B show a movement device constituting a second embodiment of the invention.

FIG. 12A shows the device in a state in which the length L of the working portion 12 of the endless belt 10 is at a maximum. Both guide wheels 20 and 20' are in their extreme position that is furthest away from the deflector pulleys 16 and 18.

Figure 12B:
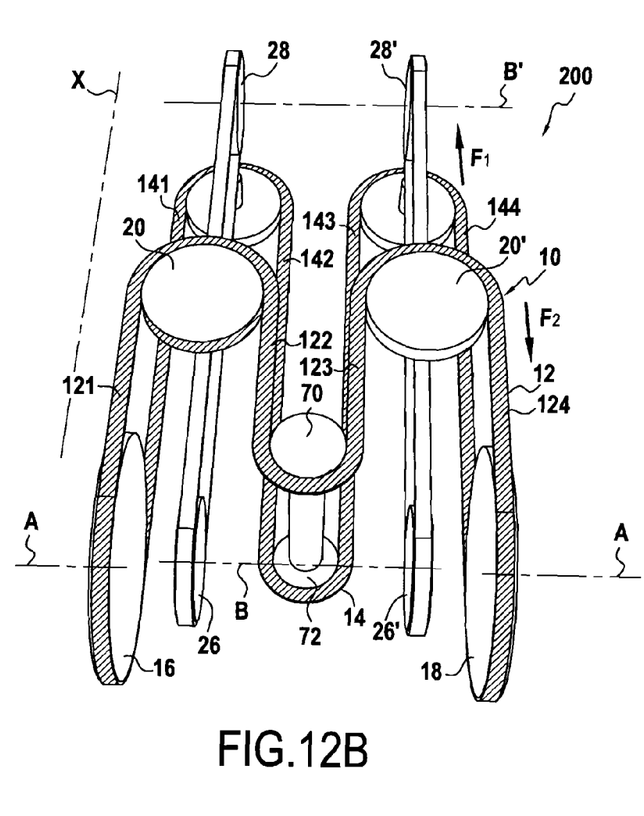

FIG. 12B shows the device in a state in which the length L of the working portion 12 of the endless belt 10 is at a minimum.

The figures show the configuration in which the guide belts 24 and 24' are moved synchronously. It is clear that the guide belts could equally well be moved independently of each other, in such a manner as to adjust the first and second strands to one length and the third and fourth strands to a different length.

Furthermore, it will readily be understood that the device can be duplicated as many times as necessary, in order to obtain a belt of length that is appropriate for production needs. Thus, more generally, the module device of the invention may comprise 2N rectilinear strands, N guide wheels 20, and (N−1) u-turn wheels 70 in the working plane P1, 2N rectilinear strands, N guide wheels 22, and (N−1) u-turn wheels 72 in the reserve plane, together with two deflector pulleys 16 and 18 for deflecting the endless belt from the working plane to the reserve plane.

What is claimed is:

1. A movement device, comprising:
   an endless belt comprising a working portion defined in a substantially horizontal working plane and a reserve portion defined in a reserve plane;
   a first guide wheel linearly movable in said working plane and guiding the endless belt;
   another first guide wheel linearly movable in said reserve plane and guiding the endless belt;
   two deflector members for deflecting the endless belt from the working plane to the reserve plane;
   drive means for driving the endless belt; and
   first movement means for synchronously moving the two first guide wheels in such a manner that the sum of the distances between each of the first guide wheels and the deflector members is constant;
   said movement device further comprising:
   at least one second guide wheel linearly movable in said working plane;
   at least one stationary u-turn member in said working plane to deflect the endless belt from said first guide wheel to said second guide wheel in said working plane;
   at least another second guide wheel linearly movable in said reserve plane;
   at least one stationary u-turn member in said reserve plane for deflecting the endless belt from said first guide wheel to said second guide wheel in said reserve plane; and
   at least one second movement means for the second guide wheels for moving said second guide wheels synchronously in such a manner that the sum of the distances between each of said second guide wheels and the deflector members remains constant;
   wherein the length of the working portion of the endless belt is capable of varying continuously and the quantity of articles that can be placed on the working portion of the belt can vary accordingly.

2. The movement device according to claim 1, wherein the working plane and the reserve plane are parallel.

3. The movement device according to claim 1, wherein the deflector members are pulleys driven by a motor, and they constitute said drive means for driving the endless belt.

4. The movement device according to claim 1, wherein said drive means includes the linearly movable guide wheels driven in rotation by a motor.

5. The movement device according to claim 1, wherein at least one of said movement means is a guide belt having a pair of one of said first and second guide wheels fastened thereto in such a manner that when the endless belt moves, it moves the pair of one of said first and second guide wheels, thereby causing the length of the working portion of the endless belt to vary.

6. The movement device according to claim 1, wherein two associated first and second guide wheels move linearly in a common guide plane.

7. The movement device according to claim 6, wherein a guide plane in which the two of the first and second guide wheels moves is perpendicular to the working plane.

8. The movement according to claim 1, wherein two associated first and second guide wheels move linearly in opposite directions in parallel.

9. The movement device according to claim 1, is used for temporary storage of articles between a first working station and a second working station.

* * * * *